(12) United States Patent
Saito

(10) Patent No.: US 12,248,716 B2
(45) Date of Patent: Mar. 11, 2025

(54) INFORMATION PROCESSING APPARATUS PROCESSING PRINT SETTING, CONTROL METHOD, AND CONTROL PROGRAM

(71) Applicant: CANON KABUSHIKI KAISHA, Tokyo (JP)

(72) Inventor: Kazuyuki Saito, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/344,682

(22) Filed: Jun. 29, 2023

(65) Prior Publication Data

US 2023/0359413 A1    Nov. 9, 2023

Related U.S. Application Data

(63) Continuation of application No. 17/571,779, filed on Jan. 10, 2022, now Pat. No. 11,782,656, which is a continuation of application No. 16/450,747, filed on Jun. 24, 2019, now Pat. No. 11,275,540.

(30) Foreign Application Priority Data

Jun. 29, 2018  (JP) .................................. 2018-125176
May 17, 2019  (JP) .................................. 2019-093739

(51) Int. Cl.
*G06F 3/12*    (2006.01)

(52) U.S. Cl.
CPC .......... *G06F 3/1234* (2013.01); *G06F 3/1205* (2013.01); *G06F 3/121* (2013.01); *G06F 3/1228* (2013.01)

(58) Field of Classification Search
CPC ...... G06F 3/1234; G06F 3/1205; G06F 3/121; G06F 3/1228
See application file for complete search history.

(56) References Cited

U.S. PATENT DOCUMENTS

| | | | |
|---|---|---|---|
| 2009/0180140 A1* | 7/2009 | Kawamura | G06F 3/1284 358/1.15 |
| 2012/0224207 A1* | 9/2012 | Sueshige | G06F 3/1288 358/1.13 |
| 2017/0160997 A1* | 6/2017 | Morita | G06K 15/1822 |

FOREIGN PATENT DOCUMENTS

| | | |
|---|---|---|
| CN | 104951257 A | 9/2015 |
| JP | 2012194966 A | 10/2012 |
| JP | 2015225480 A | 12/2015 |
| JP | 2017194766 A | 10/2017 |
| JP | 2018036755 A | 3/2018 |
| JP | 2018092583 A | 6/2018 |

* cited by examiner

*Primary Examiner* — Quang N Vo
(74) *Attorney, Agent, or Firm* — Canon U.S.A., Inc. IP Division

(57) ABSTRACT

An information processing apparatus generates print data by executing a printer driver based on an instruction issued by an application operating in an operating system. The information processing apparatus includes an eliminating unit configured to eliminate conflict or inconsistency of a print setting based on conflict eliminating information for eliminating conflict of a setting to be input to the printer driver under control of an application which processes the print setting, and an input unit configured to input a print setting obtained after conflict is eliminated by the eliminating unit to the printer driver using the application.

18 Claims, 12 Drawing Sheets

FIG. 12

```
*Feature: PaperSize
{
        *Conflict Priority: 100
        *DefaultOption: A4
        *Option: A4
        *Option: A3
        *Option: Custom
        *Option: Envelope DL
        *Option: JAPANESE_POSTCARD
}

*Feature: Duplex
{
        *Name: "Duplex"
        *DefaultOption: NONE
        *PrintSchemaKeywordMap: "DucumentDuplex"
        *Option: NONE
        {
                *Name: "Simplex"
        }
        *Option: LongEdge
        {
                *Name: "LongEdge Duplex"
        }
        *Option: ShortEdge
        {
                *Name: "ShortEdge Duplex"
        }
}

*InvalidCombination LIST(PaperSize.JAPANESE_POSTCARD, Duplex.LongEdge)
*InvalidCombination LIST(PaperSize.JAPANESE_POSTCARD, Duplex.ShortEdge)
```

INFORMATION PROCESSING APPARATUS PROCESSING PRINT SETTING, CONTROL METHOD, AND CONTROL PROGRAM

CROSS-REFERENCE TO RELATED APPLICATIONS

This application is a Continuation of U.S. patent application Ser. No. 17/571,779, filed Jan. 10, 2022, which is a Continuation of U.S. patent application Ser. No. 16/450,747, filed Jun. 24, 2019, now U.S. Pat. No. 11,275,540, which claims the benefit of Japanese Patent Application No. 2018-125176, filed Jun. 29, 2018, and Japanese Patent Application No. 2019-093739, filed May 17, 2019, all of which are hereby incorporated by reference herein in their entirety.

BACKGROUND OF THE INVENTION

Field of the Invention

The present invention relates to an information processing apparatus, a method for controlling the information processing apparatus, and a control program. The present invention relates to a system which processes a print setting, for example.

Description of the Related Art

Software for controlling an image forming apparatus may be configured such that printing is instructed to the image forming apparatus connected to a host computer using a printer driver installed in the host computer. An operating system (OS) which is basic software is installed in the host computer, and the printer driver is configured in accordance with a specification specified by the OS. Venders which provide such an image forming apparatus may obtain a unit which issues a print instruction to the image forming apparatus by providing a printer driver suitable for the specification of the OS.

However, in recent years, the OS provides a general printer driver so as to provide a unit which issues a print instruction using an industry-standard protocol.

In general, prohibition information may be incorporated in the printer driver only if the printer driver is provided by a printer vender.

SUMMARY OF THE INVENTION

According to an aspect of the present invention, an information processing apparatus generates print data by executing a printer driver based on an instruction issued by an application operating in an operating system. The information processing apparatus includes an eliminating unit configured to eliminate conflict or inconsistency of a print setting based on conflict eliminating information for eliminating conflict of a setting to be input to the printer driver under control of an application which processes the print setting, and an input unit configured to input a print setting obtained after conflict is eliminated by the eliminating unit to the printer driver using the application.

Further features of the present invention will become apparent from the following description of exemplary embodiments with reference to the attached drawings.

BRIEF DESCRIPTION OF THE DRAWINGS

FIG. 12 is a diagram illustrating an example of prohibition information.

DESCRIPTION OF THE EMBODIMENTS

Preferred embodiments of the present invention will be described hereinafter with reference to the accompanying drawings.

First Embodiment

Figure 1:
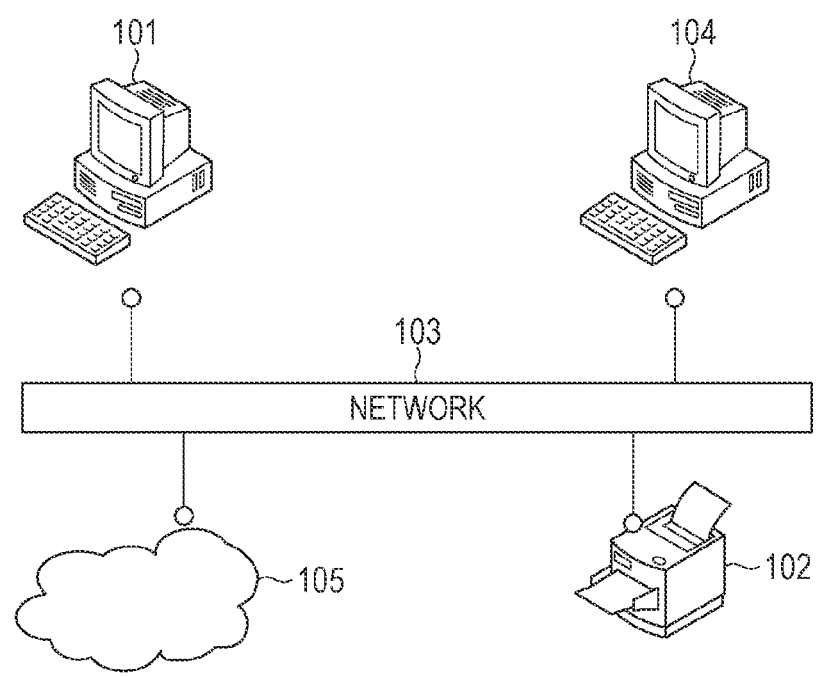
FIG. 1 is a diagram illustrating a system configuration.

First, a configuration of a system according to a first embodiment will be described with reference to FIG. 1. FIG. 1 is a diagram schematically illustrating a system configuration according to this embodiment. The system of this embodiment includes a client computer 101, a server 104, and a printer 102. The client computer 101 is an example of an information processing apparatus. The server 104 delivers data to the client computer 101. The printer 102 receives print data of a page description language (PDL) format and performs printing. The apparatuses may communicate with one another through a network 103 including a wide area network (WAN). Note that the printer 102 may be a single function printer only including a print function or a multi-function printer including a print function, a scan function, and a copy function. Furthermore, only a single client computer 101 or a plurality of client computers 101 may be connected to the network 103.

Figure 2:
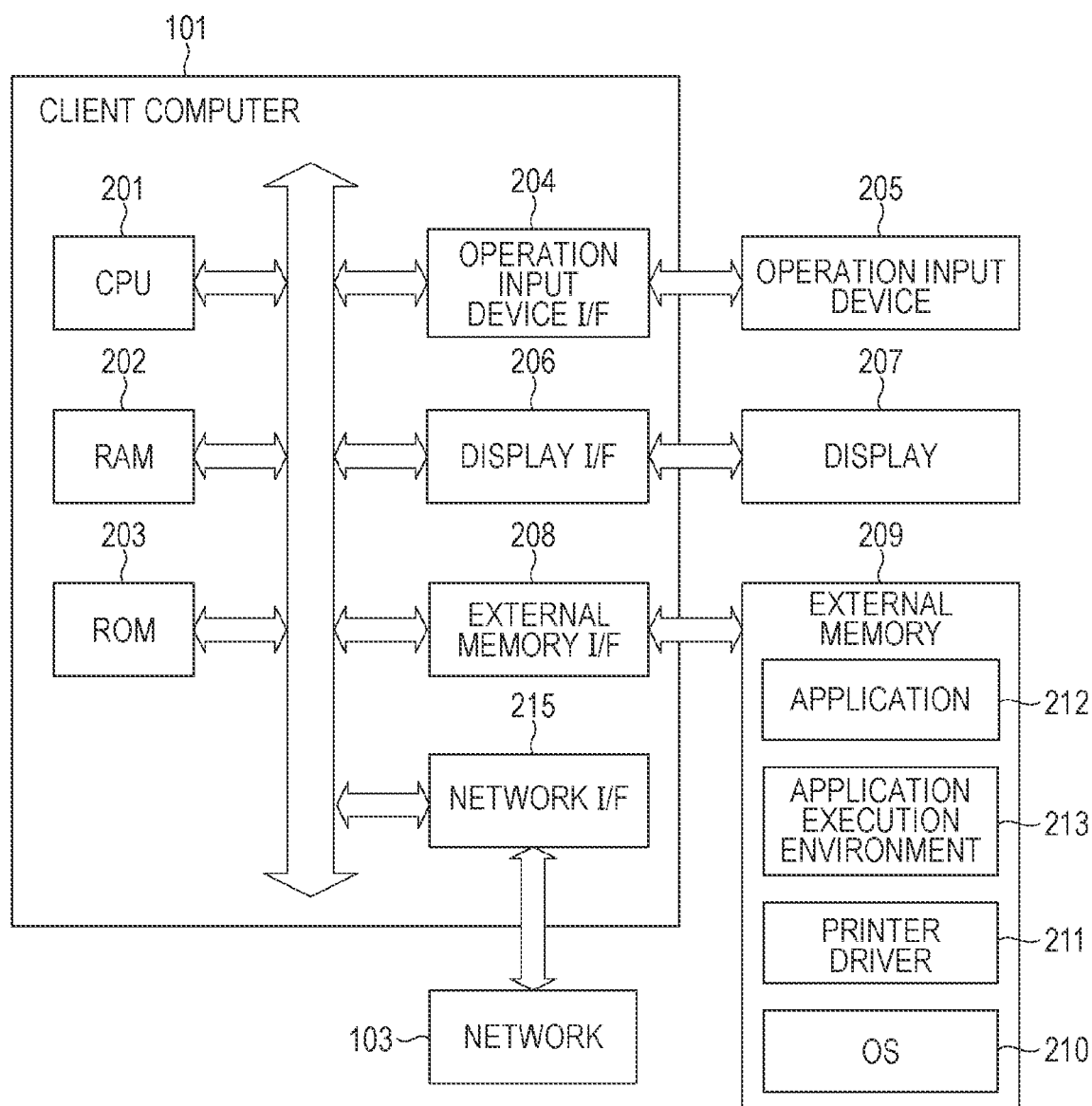
FIG. 2 is a diagram illustrating an example of a hardware configuration of a client computer.

FIG. 2 is a block diagram illustrating a hardware configuration of the client computer 101 of FIG. 1. In the client computer 101, a central processing unit (CPU) 201 controls various devices connected to a system bus in accordance with programs stored in a random access memory (RAM) 202. Note that the client computer 101 includes at least one CPU 201. Furthermore, when the CPU 201 executes processes based on programs stored in an external memory 209, a software configuration of the client computer 101 and processes of steps in flowcharts described below are realized. The RAM 202 functions as a main memory, a work area, and the like of the CPU 201. A read only memory (ROM) 203 includes various programs, such as a boot program and a basic input/output system (BIOS) written therein. An operation input device interface (I/F) 204 controls an operation input device 205 including a keyboard, a pointing device (a mouse), or a touch user interface (UI). The operation input device 205 functions as a reception unit which receives a user operation. A display I/F 206 controls screen display on a display 207. The display 207 functions as a display unit which displays information for a user. An external memory I/F 208 controls access to the external memory 209, such as a hard disk (HD) or a solid state disc (SSD). The external memory 209 stores, in addition to an operating system program (OS) 210, an application execution environment 213, various applications 212 for a touch panel and a desktop, various files, and the like. Then the external memory 209 functions as a storage medium which is readable by the client computer 101. A network I/F 215 is connected to the printer 102 through the network 103 and performs a communication control process. Note that the server 104 also has the same hardware configuration as the client computer 101 and similarly operates. The various applications 212 illustrated in FIG. 2 at least includes an extended print application 300, a desktop application 302, and a touch application 301 illustrated in FIG. 3. A printer driver 211 includes a general printer driver 320. Commands of the plurality of programs are read to the RAM 202 and executed under control of the CPU 201. Then processes of the flowcharts described below illustrated with reference to the drawings are executed.

Figure 3:
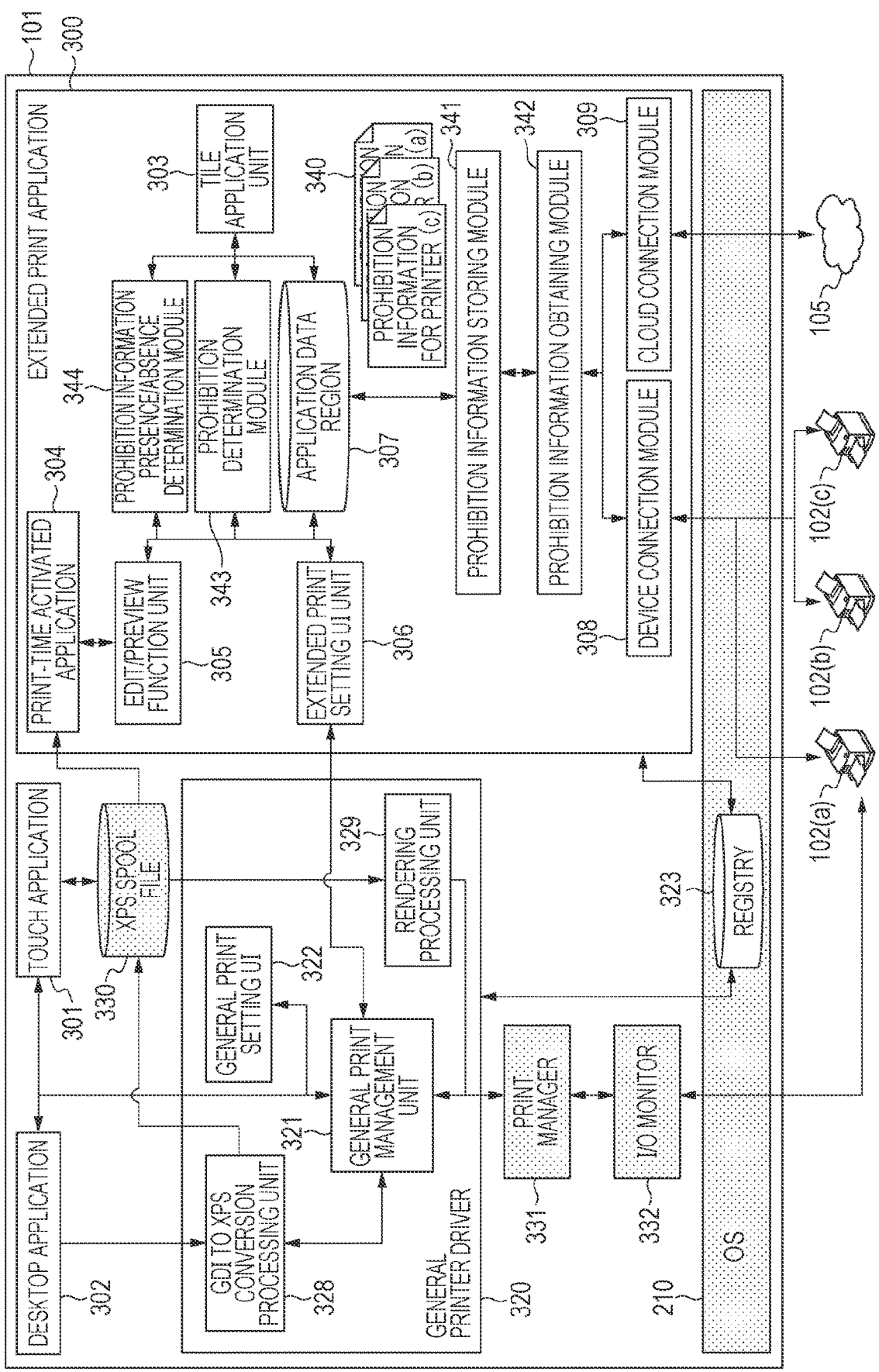
FIG. 3 is a diagram illustrating an example of a software configuration of the client computer.

FIG. 3 is a block diagram illustrating a print system according to this embodiment. The user executes a print process using the desktop application 302 or the touch application 301. In the print process, three processes including selection of a printer, generation of a print setting, and conversion of rendering data are executed in this order.

In this embodiment, software included in the client computer 101 is configured by the various applications, such as the desktop application 302, the touch application 301, and the extended print application 300. The software operates in the OS 210. Various configurations will be described hereinafter. The OS 210 may include a print manager 331, an I/O monitor 332, an XPS spool file 330, and a registry 323. A general print management unit 321 manages control of various modules in a general print driver described below and transmission and reception of data. The general print management unit 321 further performs generation and a change of print setting information. The registry 323 is a region including a setting group of the OS 210 described therein. The print manager 331 manages schedule of the print process. The I/O monitor 332 communicates with the printer 102. A general print setting UI 322 performs a setting and a change of print associated with a general printer driver. A GDI to XPS conversion processing unit 328 converts rendering data to be printed by the desktop application 302 into an XPS so as to generate the XPS spool file 330 to be supplied to a spooler included in the OS 210. A rendering processing unit 329 renders the XPS spool file 330 and converts the XPS spool file 330 into PDL. The touch application 301 is selected by the user through an application delivery system disclosed on the Internet and installed in the client computer 101. The extended print application 300 which is a type of the touch application 301 is obtained by the OS 210 through the Internet using the application delivery system and is installed in the client computer 101.

An application data region 307 stores data to be uniquely used for each application. Note that the application data region 307 may be accessed only by a corresponding application. A prohibition information presence/absence determination module 344 determines whether prohibition information 340 of the printer 102 associated with the extended print application 300 has been stored in the application data region 307. A prohibition information storing module 341 stores the prohibition information 340 of the printer 102 associated with the extended print application 300 in the application data region 307. Different types of the printer 102 may be connected as illustrated in FIG. 3, and in this case, the prohibition information 340 is stored in the application data region 307 for each printer. A tile application unit 303 displays a UI of a tile form in response to a user operation for activating the extended print application 300. An extended print setting UI unit 306 displays a UI for an extended print setting in response to a reception of an extended print setting event issued by the OS 210. The extended print setting UI unit 306 generates a UI for an extended print setting based on print setting information supplied from the OS 210 and print functionality information uniquely obtained through communication with the printer 102. The extended print setting UI unit 306 returns the print setting information to the OS 210 after changing a value of the print setting information in accordance with a user input. A print-time activated application 304 provides a function of executing a process associated with print, which is referred to as a workflow (WF), in response to a predetermined user operation or the like. Furthermore, the print-time activated application 304 is a background task for activating an edit/preview function unit 305 which is a foreground task when a print event is issued by the OS 210. The print-time activated application 304 issues a request for activating the edit/preview function unit 305 to the OS 210. Furthermore, the print-time activated application 304 performs transmission and reception of the print setting information with the edit/preview function unit 305 through the application data region 307. The edit/preview function unit 305 obtains the print setting information and changes a setting. In this embodiment, the edit/preview function unit 305 also performs obtainment and storage of the prohibition information 340 and a prohibition determination process. FIG. 12 is a diagram illustrating a text file including a definition of a print function and invalid combination of functions described therein. The text file is an example of the prohibition information 340.

A prohibition information obtaining module 342 obtains print functionality information, the prohibition information 340, and the like from the target printer 102 or a cloud server 105 through a device connection module 308 and a cloud connection module 309. The device connection module 308 communicates with the printer 102. The cloud connection module 309 communicates with the predetermined cloud server 105. A prohibition determination module 343 determines whether conflict occurs in the print setting using the prohibition information 340 relative to an input of the print setting.

Next, a mechanism in which the prohibition determination process of a print setting which may not be performed by the general printer driver is performed by the extended print application 300 will be described with reference to FIGS. 4 to 7. The CPU 201 is an example of a storage control unit.

Figure 4:
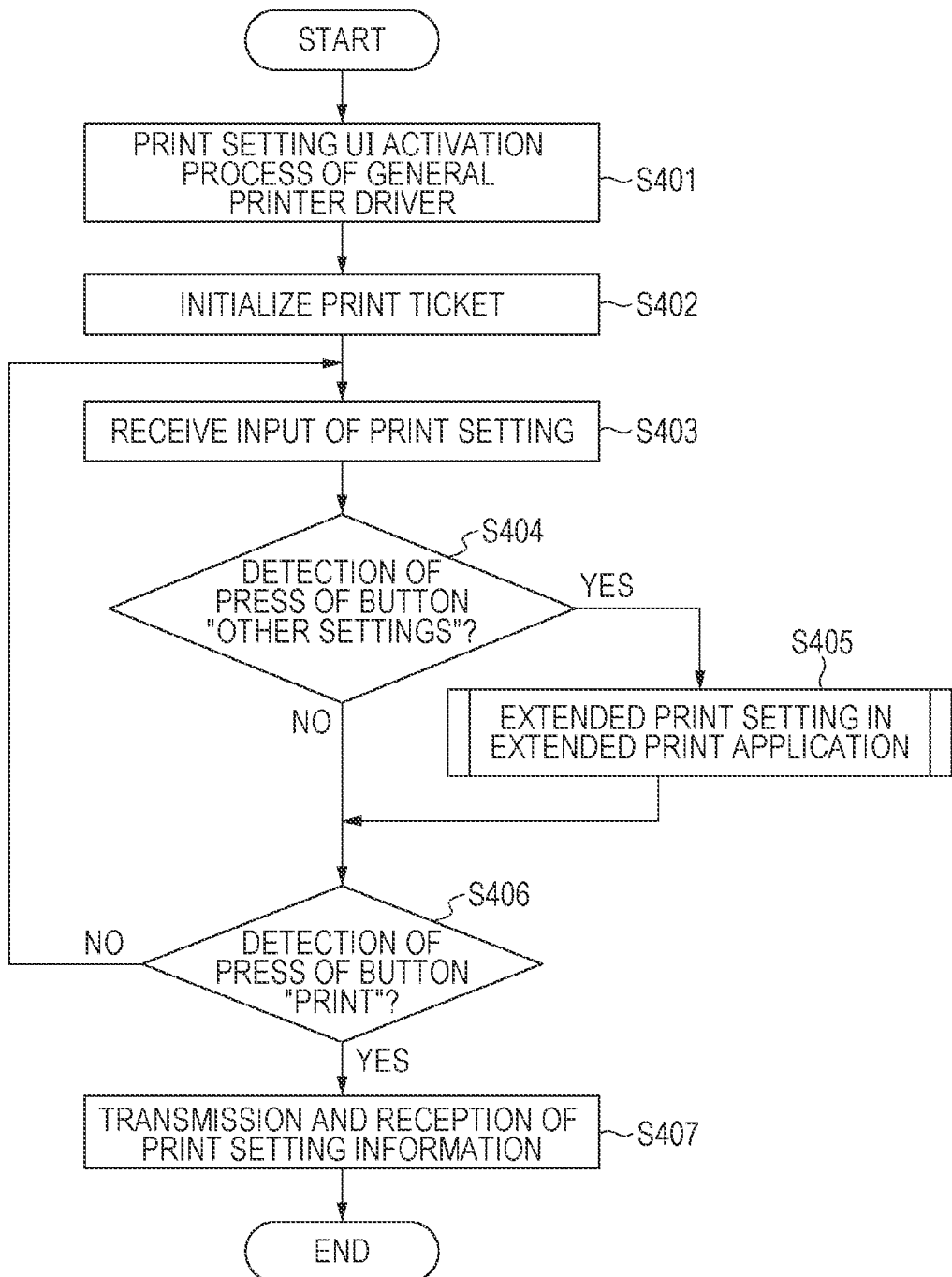
FIG. 4 is a flowchart of an example of a process performed by a general printer driver or the like according to a first embodiment.

Note that the applications and the modules are stored in the external memory 209, loaded to the RAM 202 where appropriate, and executed by the CPU 201 included in the client computer 101. A flow of FIG. 4 is started when a print setting request event is generated by a predetermined application. Examples of the predetermined application include a spreadsheet, a document editing application, and a paint application, but the application is not limited to these. The predetermined application may be included in the applications 212 of FIG. 2. Note that the application which causes the print setting request event may be the touch application 301 or the desktop application 302.

Figure 10A:
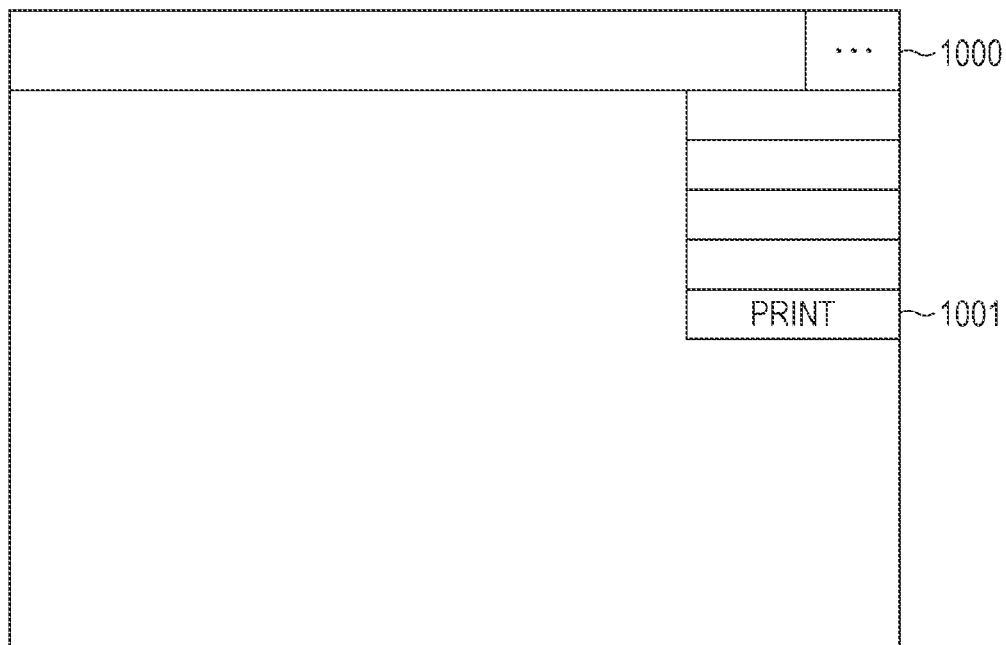
FIGS. 10A and 10B are diagrams schematically illustrating examples of user interfaces (UIs) of a touch panel and a general printer driver.
Figure 10B:
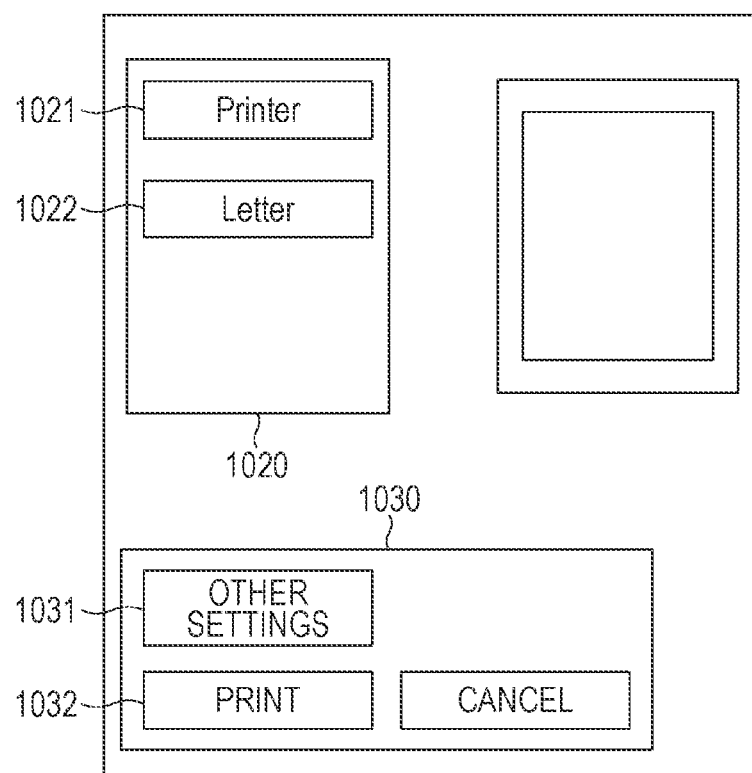

In this embodiment, a case where the touch application 301 (FIG. 10) is used will be described. FIG. 10A is a diagram schematically illustrating the touch application 301 which has been activated. The touch application 301 displays a list of options in a menu when a menu icon button 1000 is tapped. Subsequently, when a print item 1001 which is one of the options in the menu is selected by a user operation, the touch application 301 transmits a request for displaying a UI of the general printer driver to the OS 210 and displays the general print setting UI 322. FIG. 10B is a diagram illustrating the general print setting UI 322 of the general printer driver 320 which is generated by the OS 210. The general print setting UI 322 includes a print setting section 1020 and an event generation section 1030. A simple list of print settings is displayed in the print setting section 1020. An item 1021 is a name of a print queue which is being selected, and an item 1022 is an example of a print setting which has been set. The general print setting UI 322 accepts a user operation after the display. This process corresponds to step S403. A print button 1032 of the event generation section 1030 is pressed (S406). In this way, a print event is generated. The print event causes a process in step S407. Hereinafter, the process will be described in detail with reference to the flow.

The flow of FIG. 4 is started when the general printer driver 320 receives a user's instruction through an application, for example. Specifically, the process in step S401 is started when the print item 1001 which is one of the options in the menu is selected, for example. The flow of FIG. 4 may be controlled by the general printer driver 320. The user's instruction may be input through the OS 210 to the general print setting UI 322.

First, the general print setting UI 322 is activated in step S401. In step S402, the general print management unit 321 of the general printer driver 320 initializes print setting information. In step S403, the general printer driver 320 receives an input of a print setting performed by the user through the general print setting UI 322 of the general printer driver 320. When the general printer driver 320 detects a press of a button 1031 indicating "other settings" in step S404, the extended print application 300 executes the extended print setting process in step S405. This process fulfills an important role and will be described hereinafter with reference to FIG. 5. After the extended print setting UI unit 306 of the extended print application 300 returns to the general print setting UI 322 of the general printer driver 320, the process proceeds to step S406. When the general printer driver 320 detects a press of a "print" button in step S406, the print setting information is supplied to the OS 210 and the print setting request process is terminated in step S407.

Next, an operation of the extended print setting process performed by the extended print application 300 will be described with reference to FIG. 5.

Figure 5:
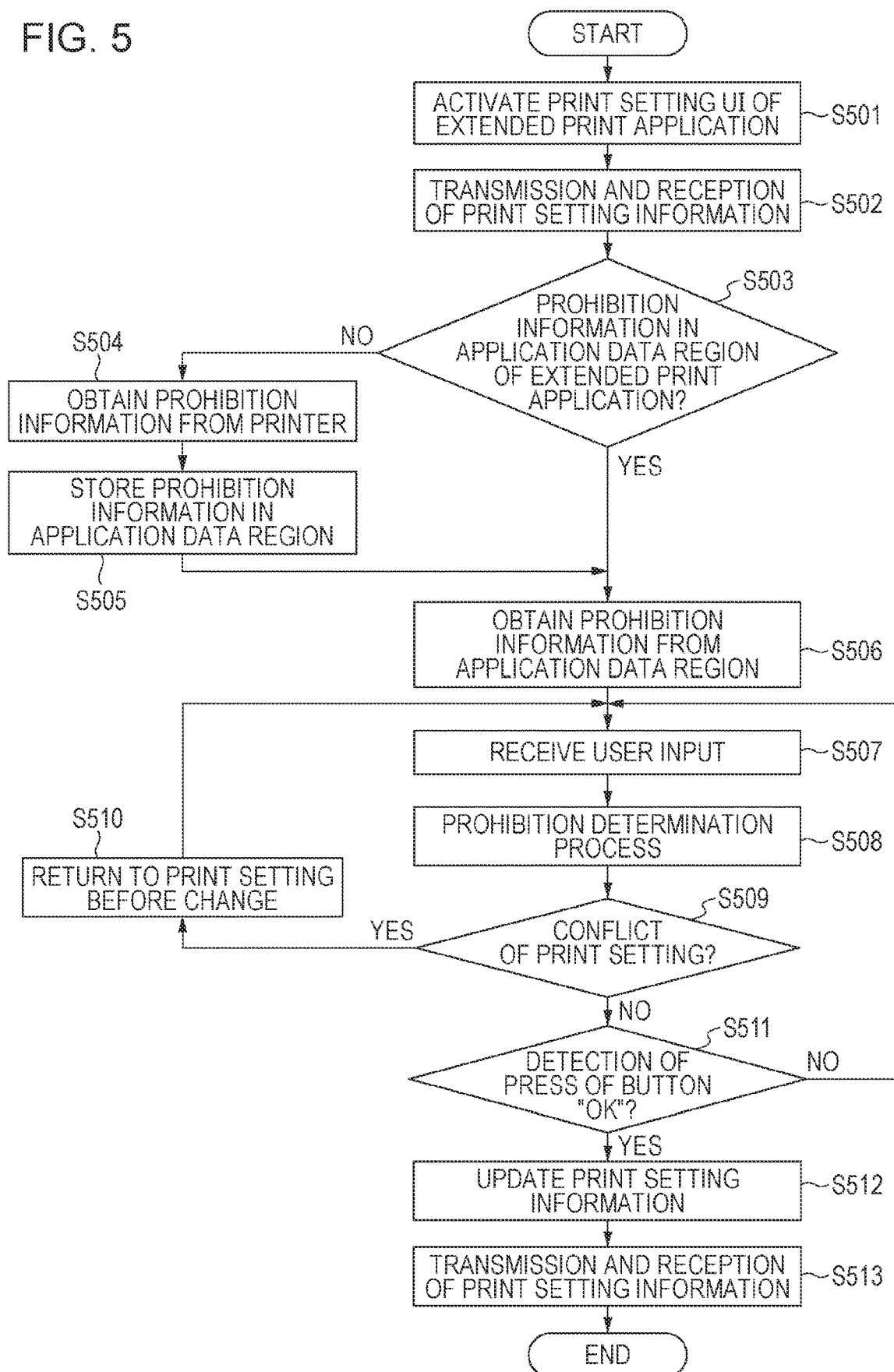
FIG. 5 is a flowchart of an example of a print setting process performed by the general printer driver according to the first embodiment.

In a flow of FIG. 5, step S501 is started when the user presses the button 1031 indicating "other settings" and the general printer driver 320 issues a request for activating the extended print setting UI unit 306 of the extended print application 300 to the OS 210. The flow of FIG. 5 may be caused under control of the extended print application 300. The extended print application 300 is an example of a control program.

Figure 11A:
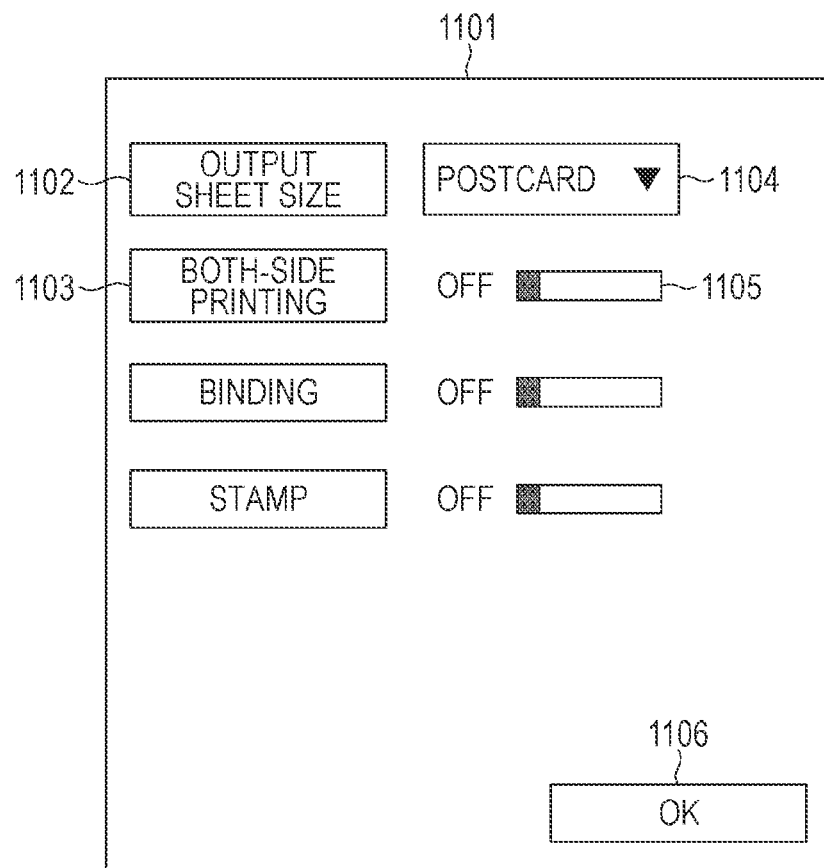
FIGS. 11A and 11B are diagrams schematically illustrating an example of an extended print setting UI.
Figure 11B:
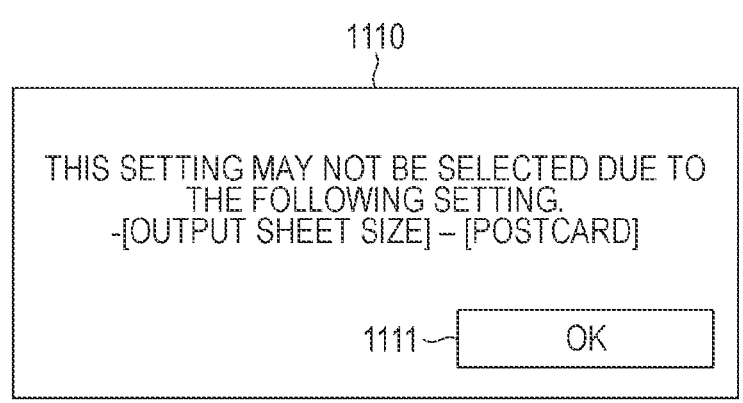

In step S501, the extended print setting UI unit 306 of the extended print application 300 is activated by the OS 210. An example of the extended print setting UI unit 306 will be described with reference to FIGS. 11A and 11B. A reference numeral 1101 indicates an example of the extended print setting UI unit 306, reference numerals 1102 and 1103 indicate various print functions, and options and ON or OFF are selected by toggling portions 1104 and 1105. A button "OK" 1106 is used to return from the extended print setting UI unit 306 to the general print setting UI 322. In step S502, the extended print application 300 receives the print setting information set by the general printer driver 320 from the OS 210. In step S503, the extended print setting UI unit 306 of the extended print application 300 determines whether the application data region 307 includes the prohibition information 340 using the prohibition information presence/absence determination module 344. When the determination is negative, the device connection module 308 of the extended print application 300 obtains the prohibition information 340 from the printer 102 in step S504. In step S505, the prohibition information storing module 341 of the extended print application 300 stores the prohibition information 340 obtained through the prohibition information obtaining module 342 in the application data region 307. In step S506, the extended print setting UI unit 306 of the extended print application 300 obtains the prohibition information 340 stored in the application data region 307. In step S507, an input of a print setting performed by the user is received through the extended print setting UI unit 306. In step S508, the extended print setting UI unit 306 performs a prohibition determination process on the input of the print setting through the prohibition determination module 343 using the prohibition information 340. In step S509, the extended print setting UI unit 306 branches the process in accordance with a result of the prohibition determination process. When conflict occurs in the print setting, the extended print setting UI unit 306 returns the print setting to the print setting before the change in step S510. Thereafter, the extended print application 300 receives an input of a print setting performed by the user through the extended print setting UI unit 306 again in step S507. For example, in the schematic diagram of FIGS. 11A and 11B, when the user selects "postcard" in the portion 1104 as an output sheet size 1102 and intends to turn on a both-sided print setting 1103 in the portion 1105, the extended print setting UI unit 306 performs the prohibition determination process using the prohibition determination module 343. In this case, since the conflict has occurred in the print setting, the extended print setting UI unit 306 returns the setting of the both-sided print to OFF which is the setting before the change, displays an alert screen 1110, and returns to the UI for receiving an input of the print setting after an input of an OK button 1111 performed by the user is received. When the conflict has not occurred in the print setting, the process proceeds to step S511. In step S511, the extended print setting UI unit 306 determines whether the "OK" button 1106 has been pressed. When the extended print application 300 has detected a press of the "OK" button 1106 in step S511, the print setting information is updated in step S512. In step S513, the extended print application 300 transmits the print setting information to the OS 210, terminates the extended print setting process, and returns to the general print setting UI 322.

When the print setting performed by the general printer driver 320 is determined, the user executes a print process using an application. In a case where printing is performed using the desktop application 302, rendering data is supplied to the GDI to XPS conversion processing unit 328 and the XPS spool file 330 is generated. Here, the GDI to XPS conversion processing unit 328 calls the general print management unit 321 so that a format of the print setting information which is unique to the OS 210 is converted into a format of general print (for example, a DEVMODE structure is converted into PrintTicket). In a case where printing is performed using the touch application 301, a method for generating an XPS file by the touch application 301 or a method for generating an XPS file by the OS 210 in accordance with an instruction issued by the touch application 301 is employed. In both of the methods, the XPS spool file 330 is generated.

An operation performed when a print request is received from the touch application 301 will be described with reference to FIG. 6.

Figure 6:
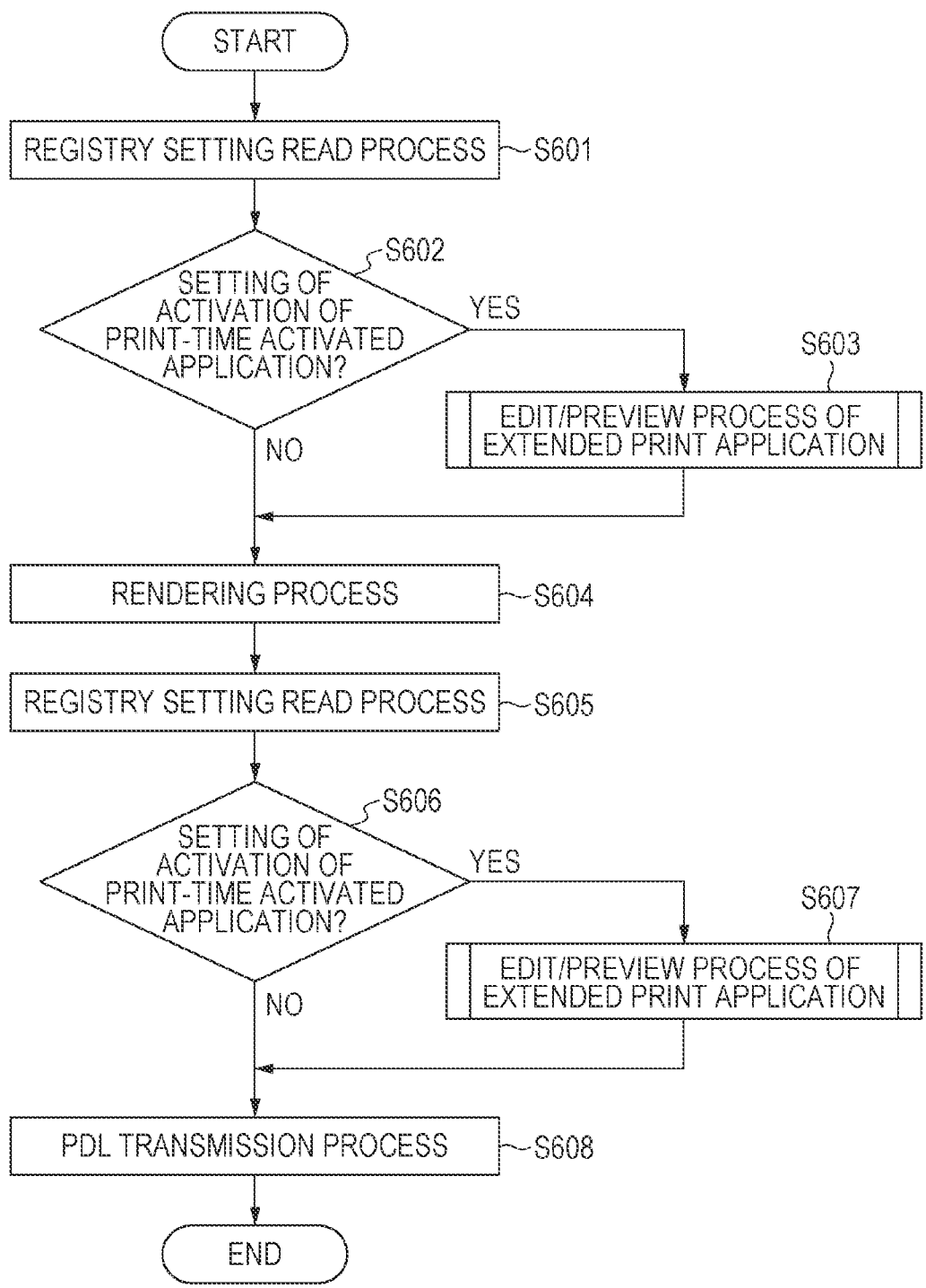
FIG. 6 is a flowchart of an example of a process of an extended print application according to the first embodiment.

In a flow of FIG. 6, step S601 is started when a print event is started by pressing the print button 1032 as an instruction issued by the user so that the XPS spool file 330 is generated.

When the XPS spool file 330 is generated, the process is temporarily passed to the OS 210 and the OS 210 reads a setting of the registry 323 in step S601. In step S602, the OS 210 determines whether activation of the print-time activated application 304 has been set in the registry 323. When the determination is negative, the OS 210 passes the process to the general printer driver 320. Thereafter, a rendering process in a next state is started in step S604. When the determination is affirmative, an edit/preview process of the extended print application 300 is started in step S603. Note that the process in step S603 will be described in detail hereinafter with reference to FIG. 7. The process in step S603 is performed by the extended print application 300. In step S604, the OS 210 passes the process to the general printer driver 320. By this, a process of the rendering processing unit 329 is started. In step S604, the rendering processing unit 329 renders the XPS spool file 330 so as to convert the XPS spool file 330 into PDL. Furthermore, at this time, print setting data is also converted from the print setting information of the OS-unique format into print setting information of industry standard. In step S605, the process is passed to the OS 210 again. The OS 210 reads the setting in the registry 323. In step S606, the OS 210 determines whether activation of the print-time activated application 304 has been set in the registry 323. When the determination is negative, the process proceeds to a PDL transmission process in a next stage in step S608. When the determination is affirmative, the process proceeds to a process of editing and previewing the extended print application in step S607. Note that the process in step S603 is also described in detail hereinafter with reference to FIG. 7. In step S608, the general print management unit 321 transmits the PDL data to the print manager 331 which performs schedule management of the print process, and print jobs are successively registered in a queue. When the printer 102 becomes available for printing, the PDL data is transmitted through the I/O monitor 332 in order of PDL data registered in the queue.

Next, the process of editing and previewing the extended print application will be described in detail with reference to FIG. 7.

Figure 7:
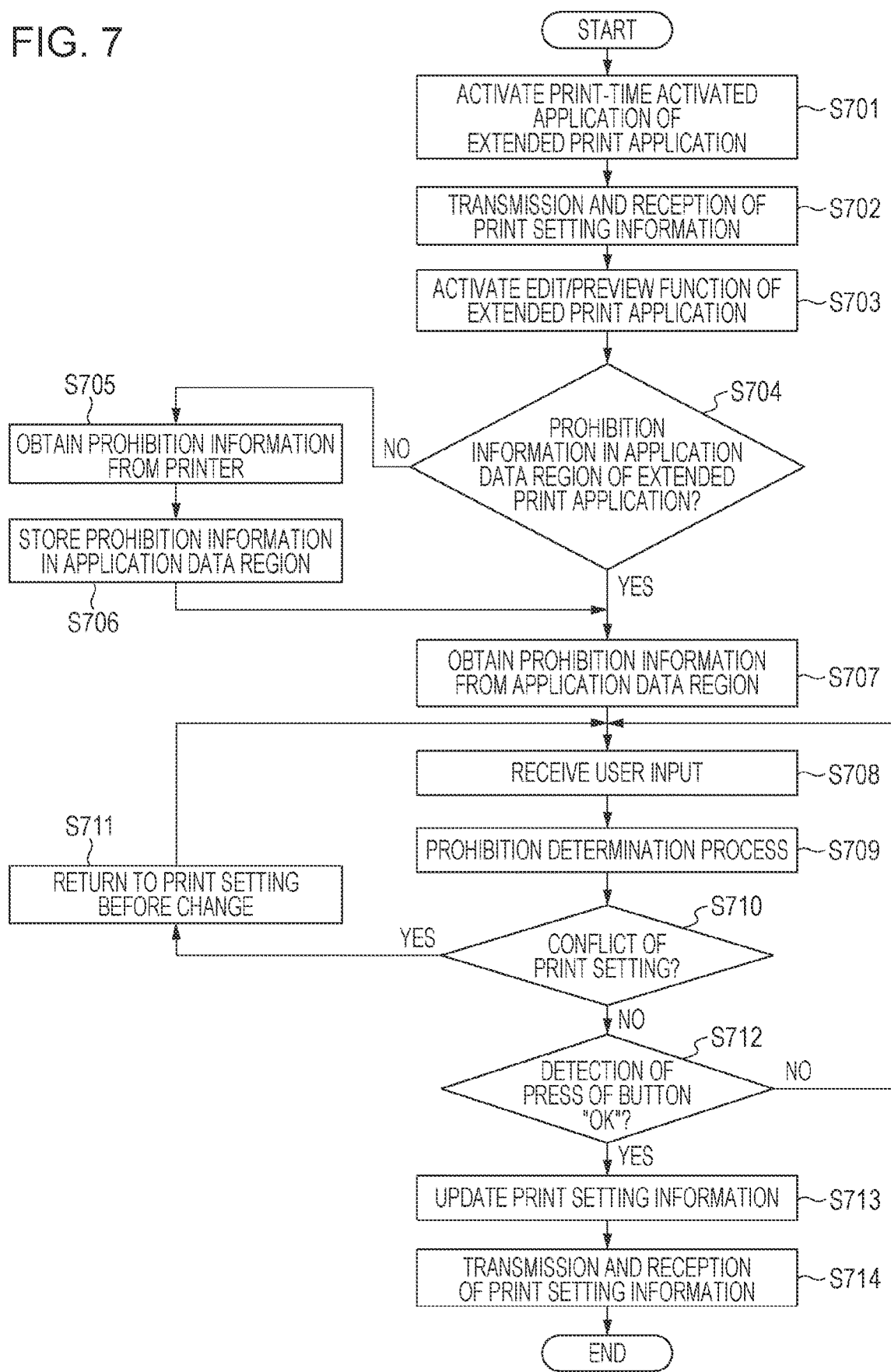
FIG. 7 is a flowchart of an example of the process of the extended print application according to the first embodiment.

In a flow of FIG. 7, step S701 is started when the OS 210 issues an instruction for activating the extended print application 300. Here, the OS 210 determines whether activation is to be performed in accordance with information in the registry 323. When the determination is affirmative, the OS 210 issues an activation instruction.

In step S701, the print-time activated application 304 of the extended print application 300 is activated by the OS 210. In step S702, the print-time activated application 304 receives the print setting information from the OS 210. In step S703, the print-time activated application 304 activates the edit/preview function unit 305 and transmits the print setting information to the edit/preview function unit 305. In step S704, the edit/preview function unit 305 determines whether the application data region 307 includes the prohibition information 340 through the prohibition information presence/absence determination module 344. When the determination is negative, the prohibition information obtaining module 342 of the extended print application 300 obtains the prohibition information 340 from the printer 102 in step S705. Thereafter, in step S706, the prohibition information storing module 341 stores the obtained prohibition information 340 in the application data region 307. In step S707, the extended print application 300 obtains the prohibition information 340 stored in the application data region 307. In step S708, an input of a print setting performed by the user is received through a UI of the edit/preview function unit 305. In step S709, the extended print application 300 performs the prohibition determination process on the input of the print setting through the prohibition determination module 343 using the prohibition information 340. In step S710, the extended print application 300 branches the process in accordance with a result of the prohibition determination process. When conflict has occurred in the print setting, the edit/preview function unit 305 of the extended print application 300 returns the print setting to the print setting before the change in step S711. Then, in step S708, an input of a print setting performed by the user is received again through the UI of the edit/preview function unit 305. When the conflict has not occurred in the print setting, the process proceeds to step S712. In step S712, the extended print application 300 determines whether the "OK" button 1106 has been pressed. When the edit/preview function unit 305 of the extended print application 300 detects a press of the "OK" button 1106 in step S712, the print setting information is updated in step S713. In step S713, the extended print application 300 transmits the print setting information to the OS 210, terminates the edit/preview function, and returns to the processing flow of FIG. 6.

As described above, according to this embodiment, the extended print application 300 performs a determination as to whether the prohibition information exists at the following timings. For example, the determination is performed at a timing when the extended print setting UI unit 306 is activated in the print setting request process. Alternatively, the determination is performed at a timing when the edit/preview function unit 305 is activated in the print request process. The determination as to whether the prohibition information 340 is included in the application data region 307 is made at these timings. When the prohibition information 340 is not included, the prohibition information 340 is obtained from the printer 102 and stored in the application data region 307. Then the prohibition determination process is performed using the obtained prohibition information 340. Therefore, even in printing using the general printer driver 320, a prohibition process unique to a printer vender or a printer may be performed.

Second Embodiment

In the first embodiment, the mechanism of a determination as to whether the prohibition information 340 is included and an obtainment of the prohibition information 340 which are performed at a time of activation of the extended print setting UI unit 306 of the extended print application 300 and at a time of activation of the edit/preview function unit 305 of the extended print application 300 in the print setting process and the print process has been described.

In a second embodiment, a mechanism of a determination as to whether prohibition information 340 is included in an application data region 307 and an obtainment of the prohibition information 340 from a printer 102 using a tile application unit 303 which is another function of an extended print application 300 will be described.

A process according to this embodiment will be described in detail with reference to FIG. 8. Note that applications and modules are stored in an external memory 209, loaded to a RAM 202 where appropriate, and executed by a CPU 201 included in a client computer 101. Furthermore, detailed descriptions of components having reference numerals which have been described are omitted.

Figure 8:
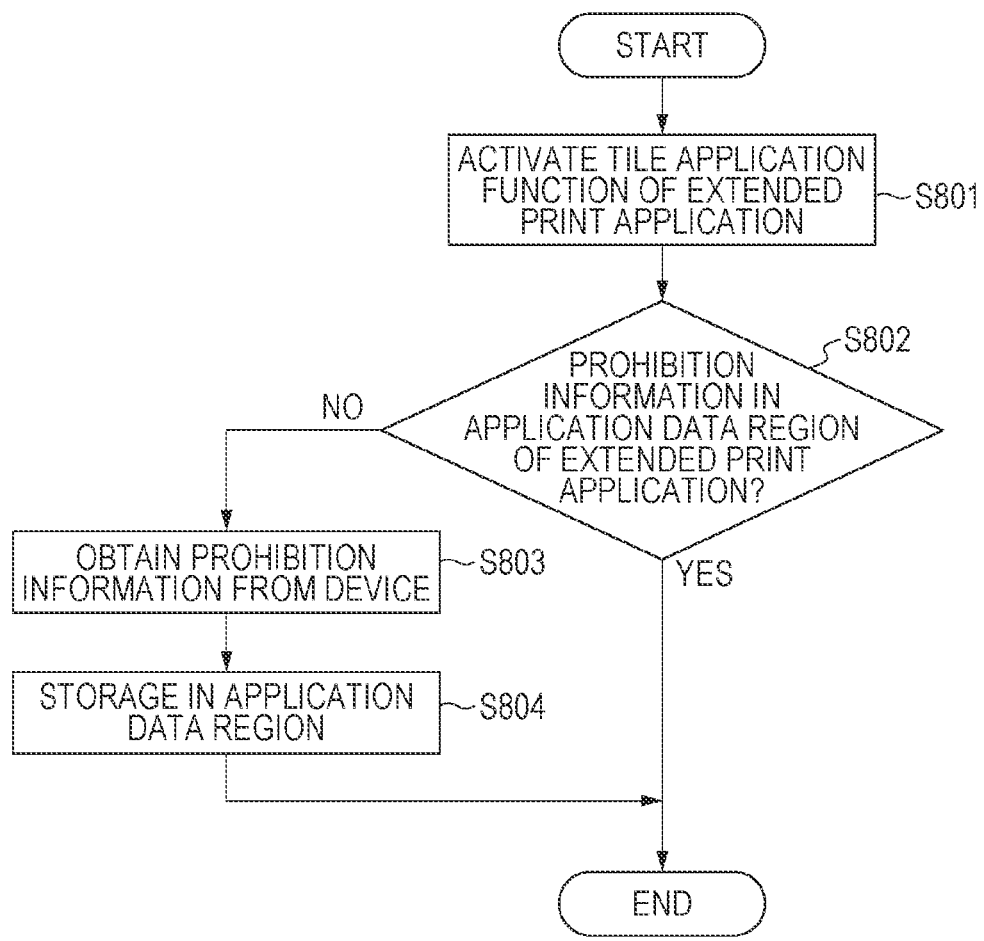
FIG. 8 is a flowchart of an example of a process of an extended print application according to a second embodiment.

In a flow of FIG. 8, step S801 is started when a user directly activates the extended print application 300.

First, in step S801, a tile application unit 303 of the extended print application 300 is activated. In step S802, the tile application unit 303 of the extended print application 300 determines whether an application data region 307 includes the prohibition information 340 through a prohibition information presence/absence determination module 344. When the determination is negative, a prohibition information obtaining module 342 of the extended print application 300 obtains the prohibition information 340 from the printer 102 in step S803. Thereafter, in step S804, a prohibition information storing module 341 of the extended print application 300 stores the obtained prohibition information 340 in the application data region 307.

As described above, according to this embodiment, the extended print application 300 may determine whether the application data region 307 includes the prohibition information 340 and obtain the prohibition information 340 from the printer 102 also in the case where the tile application unit 303 is used. Therefore, in a case where the tile application unit 303 is used, a burdensome operation of separately obtaining the prohibition information 340 from the printer 102 when the print setting process or the print process is performed may be omitted. The process of FIG. 8 may update or add the prohibition information 340 by activating the extended print application 300 asynchronous to or independently from processes other than the process in FIG. 8 according to this embodiment.

Third Embodiment

In the first embodiment, the mechanism of an obtainment of the prohibition information 340 by the extended print application 300 from the printer 102 has been described.

In a third embodiment, a mechanism of an obtainment of prohibition information 340 from a location other than a printer body will be described. Hereinafter, portions different from the foregoing embodiment will be mainly described.

Figure 9:
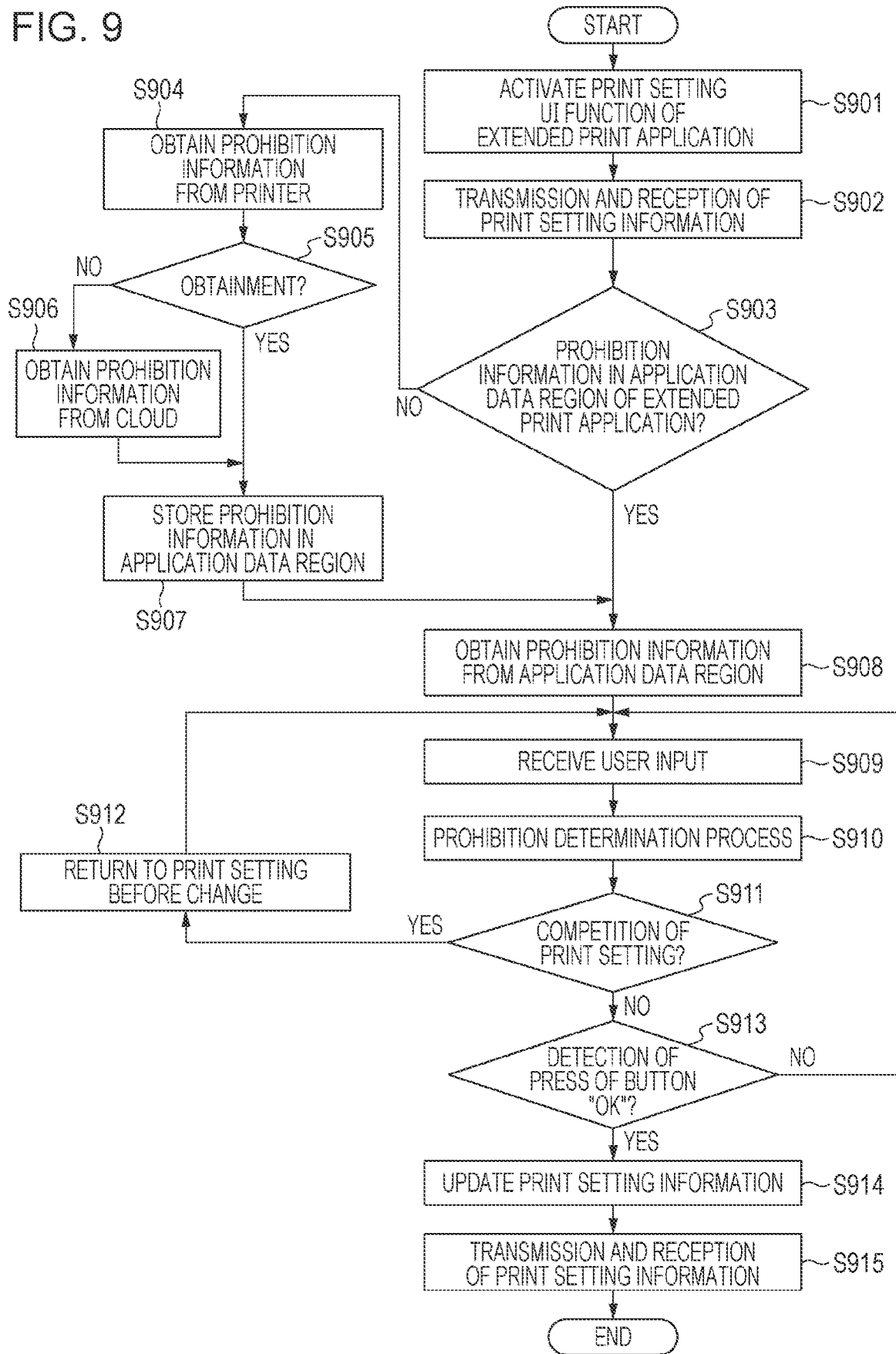
FIG. 9 is a flowchart of an example of the process of the extended print application according to the second embodiment.

A process according to this embodiment will be described in detail with reference to FIG. 9. Note that applications and modules are stored in an external memory 209, loaded to a RAM 202 where appropriate, and executed by a CPU 201 included in a client computer 101. Furthermore, detailed descriptions of components having reference numerals which have been described are omitted. Furthermore, although examples of an extended print setting UI unit 306 and an edit/preview function unit 305 are illustrated in this embodiment, the same mechanism may be attained when a tile application unit 303 is employed as illustrated in the second embodiment. Note that a process performed by a general printer driver 320 before and after an extended print setting is performed by an extended print application 300 is the same as the process from step S401 to step S407 of FIG. 4, and therefore, a detailed description thereof is omitted. In a flow of FIG. 9, step S901 is started when a user presses a button 1031 indicating "other settings" and the general printer driver 320 issues a request for activating an extended print setting UI unit 306 of the extended print application 300 to the OS 210.

In step S901, the extended print setting UI unit 306 of the extended print application 300 is activated by the OS 210. In step S902, a print-time activated application 304 receives print setting information from the OS 210. In step S903, the extended print setting UI unit 306 of the extended print application 300 determines whether an application data region 307 includes the prohibition information 340 through a prohibition information presence/absence determination module 344. When the determination is negative, a prohibition information obtaining module 342 of the extended print application 300 obtains the prohibition information 340 from the printer 102 in step S904. In step S905, a prohibition information storing module 341 of the extended print application 300 determines whether the prohibition information 340 has been successfully obtained from the printer 102. When the determination is negative, a prohibition information obtaining module 342 of the extended print application 300 obtains the prohibition information 340 corresponding to the printer 102 from a predetermined cloud server in step S906. Thereafter, in step S907, the prohibition information storing module 341 of the extended print application 300 stores the obtained prohibition information 340 in an application data region 307. In step S908, the extended print application 300 obtains the prohibition information 340 stored in the application data region 307. Note that the process from step S909 to step S915 is the same as that from step S507 to step S513 of FIG. 5, and therefore, a detailed description thereof is omitted.

As described above, according to this embodiment, the extended print application 300 may obtain the prohibition information 340 also from a location other than a printer body. Therefore, even in a case where the prohibition information 340 is not stored in the printer body, such as a case where the date of production of the printer is old or a case of a low-priced printer, the extended print application 300 may obtain the prohibition information 340 and perform a prohibition process.

This embodiment is summarized as follows. The information processing apparatus generates print data by executing a printer driver based on an instruction issued by an application operating in an operating system. An example of the information processing apparatus is the client computer 101.

An example of the application which processes a print setting is the extended print application 300. For example, conflict or inconsistency of a print setting is eliminated based on the prohibition information 340 for eliminating conflict of a setting to be input to a printer driver under control of the touch application 301. An example of conflict eliminating information is the prohibition information 340. The print setting obtained after conflict is eliminated is input to the printer driver from the extended print application 300. An example of the printer driver is the general printer driver 320.

Furthermore, the determination as to whether the conflict eliminating information is included in the application data region 307 is made. An example of an image forming apparatus is the printer 102. The device connection module 308 obtains the conflict eliminating information from the printer 102. Furthermore, the CPU 201 stores the conflict eliminating information obtained by the device connection module 308 in the application data region 307.

The extended print application 300, for example, eliminates conflict of the print setting using the prohibition information 340 stored in the application data region 307.

The extended print application 300 is executed at the following timings, for example. Specifically, the extended print application 300 is executed at a timing when the tile application unit 303 is activated or at a timing when a user interface program for an extended print setting is activated. Alternatively, the extended print application 300 is executed at a timing when the edit/preview function unit 305 is activated.

In a case where prohibition information may not be obtained from the printer 102, conflict eliminating information may be obtained from a predetermined external information processing apparatus. An example of the external information processing apparatus is the cloud server 105.

An example of the operating system is the OS 210. Furthermore, print data may be generated by executing the general printer driver based on an instruction issued by the document editing application operating in the OS 210. Then the extended print application 300 receives a predetermined event caused by the general printer driver 320. The extended print application 300 performs the following process after the receiving unit receives a predetermined event caused by the general printer driver 320. Specifically, the extended print application 300 is executed by the CPU 201. Then, conflict or inconsistency of a print setting is eliminated based on the conflict eliminating information for eliminating conflict of a setting to be input to a printer driver under control of the extended print application 300. The extended print application 300 is an example of an application which processes the predetermined extended print setting.

Then the print setting obtained after the conflict is eliminated is input to the printer driver from the extended print application 300.

As described above, this embodiment discusses the following solutions. There is a demand for reducing a portion depending on peripherals from a general OS or a general device driver so that a platform environment which is compatible with mobile devices including smartphones and tablets is created. In such a platform environment, there arises a problem in that it is difficult to incorporate the process which depends on specifications of peripherals in the general OS or the general device driver. However, this problem may be solved. Furthermore, there arises a problem in that it is difficult to incorporate a process and data required for a prohibition process of a printer driver or the like in the general OS or the general device driver. However, this problem may be solved.

According to the embodiments, a mechanism for removing the process which depends on specifications of peripherals from the general OS or the general device driver may be provided.

For example, a mechanism associated with a platform environment which is compatible with mobile devices including smartphones and tablets, for example, may be provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control method for controlling an information processing apparatus storing printing software and a print setting application, the control method being performed based on execution of the print setting application, the control method comprising:

causing a display to display a print setting screen for setting print setting values, the print setting screen being provided by the print setting application, the print setting values including a print setting value which is not able to be set via a screen provided by the printing software, the print setting application supporting the printing software;

determining whether the print setting values set via the displayed print setting screen include a set of print setting values that conflict with each other, wherein the set corresponds to information obtained from an external apparatus;

causing the display to display notification regarding a conflict among the print setting values in a case that it is determined that the print setting values include the set of the print setting values that conflict with each other; and providing the print setting values set via the print setting screen to the printing software, wherein the provided print setting values do not include the set of the print setting values, and wherein the printing software is configured to generate print data printable by printers of different types and is able to cause the information processing apparatus to transmit the print data to the printers.

2. The control method according to claim 1, wherein the print setting screen is a screen based on capability information obtained from at least one printer of the printers.

3. The control method according to claim 2, wherein the external apparatus is the printer.

4. The control method according to claim 1, wherein the information obtained from the external apparatus is obtained according to a predetermined protocol.

5. The control method according to claim 4, wherein the printing software converts the print setting values to be provided to an operating system of the information processing apparatus into values according to the predetermined protocol.

6. The control method according to claim 5, wherein the predetermined protocol is an Internet Printing Protocol.

7. The control method according to claim 2, wherein the print setting application causes the display to display the print setting screen based on reception of a predetermined user instruction, and wherein the user instruction is received in a situation that the printer is selected as a destination of the print data generated by the printing software.

8. The control method according to claim 1, wherein the information indicates the set of print setting values that conflict with each other.

9. The control method according to claim 1, further comprising:
changing one of the print setting values, in a case that it is determined that the print setting values include the set of the print setting values that conflict with each other.

10. The control method according to claim 1, wherein the printing software is provided by a supplier of an operating system of the information processing apparatus.

11. A non-transitory computer-readable storage medium storing a print setting application that causes an information processing apparatus storing printing software to:
cause a display to display a print setting screen for setting print setting values, the print setting screen being provided by the print setting application, the print setting values including a print setting value which is not able to be set via a screen provided by the printing software, the print setting application supporting the printing software;
determine whether the print setting values set via the displayed print setting screen include a set of print setting values that conflict with each other, wherein the set corresponds to information obtained from an external apparatus;
cause the display to display notification regarding a conflict among the print setting values in a case that it is determined that the print setting values include the set of the print setting values that conflict with each other; and
provide the print setting values set via the print setting screen to the printing software, wherein the provided print setting values do not include the set of the print setting values, and wherein the printing software is configured to generate print data printable by printers of different types and is able to cause the information processing apparatus to transmit the print data to the printers.

12. The non-transitory computer-readable storage medium according to claim 11, wherein the print setting screen is a screen based on capability information obtained from at least one printer of the printers, and wherein the capability information is obtained according to an Internet Printing Protocol.

13. The non-transitory computer-readable storage medium according to claim 12, wherein the external apparatus is the printer.

14. The non-transitory computer-readable storage medium according to claim 12, wherein the print setting application causes the display to display the print setting screen based on reception of a predetermined user instruction, and wherein the user instruction is received in a situation that the printer is selected as a destination of the print data generated by the printing software.

15. The non-transitory computer-readable storage medium according to claim 11, wherein the printing software converts the print setting values to be provided to an operating system of the information processing apparatus into values according to a predetermined protocol.

16. The non-transitory computer-readable storage medium according to claim 15, wherein the predetermined protocol is an Internet Printing Protocol.

17. The non-transitory computer-readable storage medium according to claim 11, wherein the printing software is provided by a supplier of an operating system of the information processing apparatus.

18. An information processing apparatus storing a print setting application and printing software that is provided by an operating system of the information processing apparatus in association with a printer identifier of a printer, the information processing apparatus comprising:
a display; and
a processor, based on execution of the print setting application, configured to:
cause the display to display a print setting screen for setting print setting values, the print setting screen being provided by the print setting application, the print setting values including a print setting value which is not able to be set via a screen provided by the printing software, the print setting application supporting the printing software;
determine whether the print setting values set via the displayed print setting screen include a set of print setting values that conflict with each other, wherein the set corresponds to information obtained from an external apparatus;
cause the display to display notification regarding a conflict among the print setting values in a case that it is determined that the print setting values include the set of the print setting values that conflict with each other; and
provide the print setting values set via the print setting screen to the printing software, wherein the provided print setting values do not include the set of the print setting values, and wherein the printing software is configured to generate print data printable by printers of different types and is able to cause the information processing apparatus to transmit the print data to the printers.

* * * * *